United States Patent [19]
Ketcham et al.

[11] Patent Number: 6,045,935
[45] Date of Patent: Apr. 4, 2000

[54] FLEXIBLE INORGANIC ELECTROLYTE FUEL CELL DESIGN

[75] Inventors: Thomas D. Ketcham, Big Flats; William Robert Powell, Elmira; Ronald L. Stewart, Big Flats; Dell J. St. Julien, Watkins Glen, all of N.Y.

[73] Assignee: Corning Incorporated, Corning, N.Y.

[21] Appl. No.: 09/251,036

[22] Filed: Feb. 18, 1999

Related U.S. Application Data
[60] Provisional application No. 60/076,333, Feb. 27, 1998.

[51] Int. Cl.[7] .............................. H01M 8/10; H01M 2/00
[52] U.S. Cl. .................. 429/30; 429/32; 429/34; 429/38
[58] Field of Search ................. 429/30, 32, 34, 429/38; 180/65.1, 65.3

[56] References Cited

U.S. PATENT DOCUMENTS

| | | |
|---|---|---|
| Re. 27,747 | 9/1973 | Johnson . |
| 3,904,473 | 9/1975 | Warner et al. . |
| 5,089,455 | 2/1992 | Ketcham et al. . |
| 5,273,837 | 12/1993 | Aitken et al. . |
| 5,519,191 | 5/1996 | Ketcham et al. . |

OTHER PUBLICATIONS

Solid Oxide Fuel Cells, The Electrochemical Society, Inc., vol. 93–4, "Preparation of Solid Electrolyte Thin Films for Relaxing Thermal Stresses", pp. 74–81 no date.

Electrochemical Proceedings, vol. 97–18, "Mechanical and Thermal Properties of a 200 Tube SOFC Reactor", pp. 619–625 no date.

The Economist, Oct. 25, 1997, "Science and Technology", pp. 89–92.

Primary Examiner—Maria Nuzzolillo
Assistant Examiner—Angela J. Martin
Attorney, Agent, or Firm—Kees van der Sterre

[57] ABSTRACT

Fuel cell designs incorporating non-planar inorganic electrolyte membranes offer improved mechanical and thermal shock resistance for mobile power generation systems, e.g., for high temperature fuel cell applications using liquid fuel (diesel and gasoline) and air for automobile power plants and other power systems requiring only intermittent high-temperature fuel cell operation.

6 Claims, 7 Drawing Sheets

FLEXIBLE INORGANIC ELECTROLYTE FUEL CELL DESIGN

This application claims the benefit of U.S. Provisional Application No. 60/076,333, filed Feb. 27, 1998, entitled "Flexible Inorganic Electrolyte Fuel Cell Design", by Ketcham et al.

FIELD OF THE INVENTION

The invention is a fuel cell using an inorganic electrolyte membrane, useful for power generation, particularly for use in transportation, more particularly, high temperature fuel cells using liquid fuel (diesel and gasoline) for automobile power plants and intermittent operation power plants. In particular, the inventive fuel cell is designed to have non-planar electrolyte/electrode structures that are mechanical and thermal shock resistant.

BACKGROUND OF THE INVENTION

Polymer electrolyte fuel cells that utilize hydrogen are well known and have been proposed for use as energy sources in automobiles. As these cells can only consume hydrogen, to utilize liquid fuels, reforming of the fuel to hydrogen and carbon monoxide/dioxide and oxidation or scrubbing of the carbon monoxide, which poisons the system at very low levels, is required.

Solid oxide fuel cells are well known, but have been limited to power sources that are not temperature cycled repeatedly. To be useful for an automotive power plant, a fuel cell needs to become operational quite fast, preferably faster than 5 minutes, more preferably less than two minutes and even more preferably less than 30 seconds. Energy requirements to keep a high temperature solid oxide type fuel cell hot all the time in an auto are prohibitive. Hence, as fuel cell would need to be heated almost every time an auto was used, the cell would need to withstand perhaps as many as 10 to 20 thousand heating cycles. Until now no inorganic electrolyte solid oxide fuel cell has been designed having sufficient thermal shock and thermal cycling resistance to be considered for this application.

Flexible thin ceramics have been described for example in co-assigned U.S. Pat. No. 5,089,455, some compositions of which would be useful electrolytes for fuel cells. Recently, U.S. Pat. No. 5,273,837 has described the use of such compositions to form a thermal shock resistant fuel cell. Nowhere in these documents is the application of these compositions and these fuel cells for automotive power plants mentioned. Thin corrugated ceramic structures have been disclosed as fluid heaters in U.S. Pat. No. 5,519,191.

The foregoing discussion is intended to show use of zirconia as an electrolyte is known, and use of ((LaSr)MnO$_3$) and other expansion matched electrically conducting perovskite structures are known for use as air side electrodes, as well as use of zirconia/nickel composites for fuel side electrodes. In addition, metals, intermetallics and LaCrO$_3$ have been used for interconnect structures. Notwithstanding, there continues to be a need for improved solid oxide fuel cells, particularly fuel cells capable of withstanding very high heating and/or thermal cycles. This is the focus of the present invention.

SUMMARY OF THE INVENTION

Briefly, the invention relates to a solid electrolyte fuel cell having an oxidant reservoir, a fuel reservoir, and an electrolyte structure interposed between the oxidant and fuel reservoir, in which the electrolyte is of non-planar sheet structure.

In one aspect, the invention relates to a solid electrolyte fuel cell in which the electrolyte is a non-planar structure of a thin, flexible, pre-sintered, polycrystalline ceramic sheet. The boundary shape of the curved electrolyte sheet is not critical and may be circular, oval, elliptical, pentagonal, hexagonal, heptagonal, octagonal or the like.

In another aspect, the solid electrolyte fuel cell is of a central feed design.

In a further aspect, the invention relates to a thermal shock resistant solid electrolyte fuel cell for repeated and intermittent on/off use, capable of withstanding 100 to 4,000 thermal cycles of from room temperature to operating temperature of up to 1000° C. in times ranging from less than five minutes to one hour.

In still another aspect, the invention relates to a solid electrolyte fuel cell capable of withstanding up to 4,000 thermal cycles of from room temperature to operating temperatures of up to 1000° C.

As used in this specification:
"heating cycle" means that the fuel cell is repeatedly and/or intermittently heated from room temperature or any beginning temperature, to an operating temperature of up to 800, 1000° C. or even higher, and then cooled back to room temperature or beginning temperature.
"non-planar" means that the electrolyte structure does not lie in a plane.

DETAILED DESCRIPTION OF THE INVENTION

Figure 1:
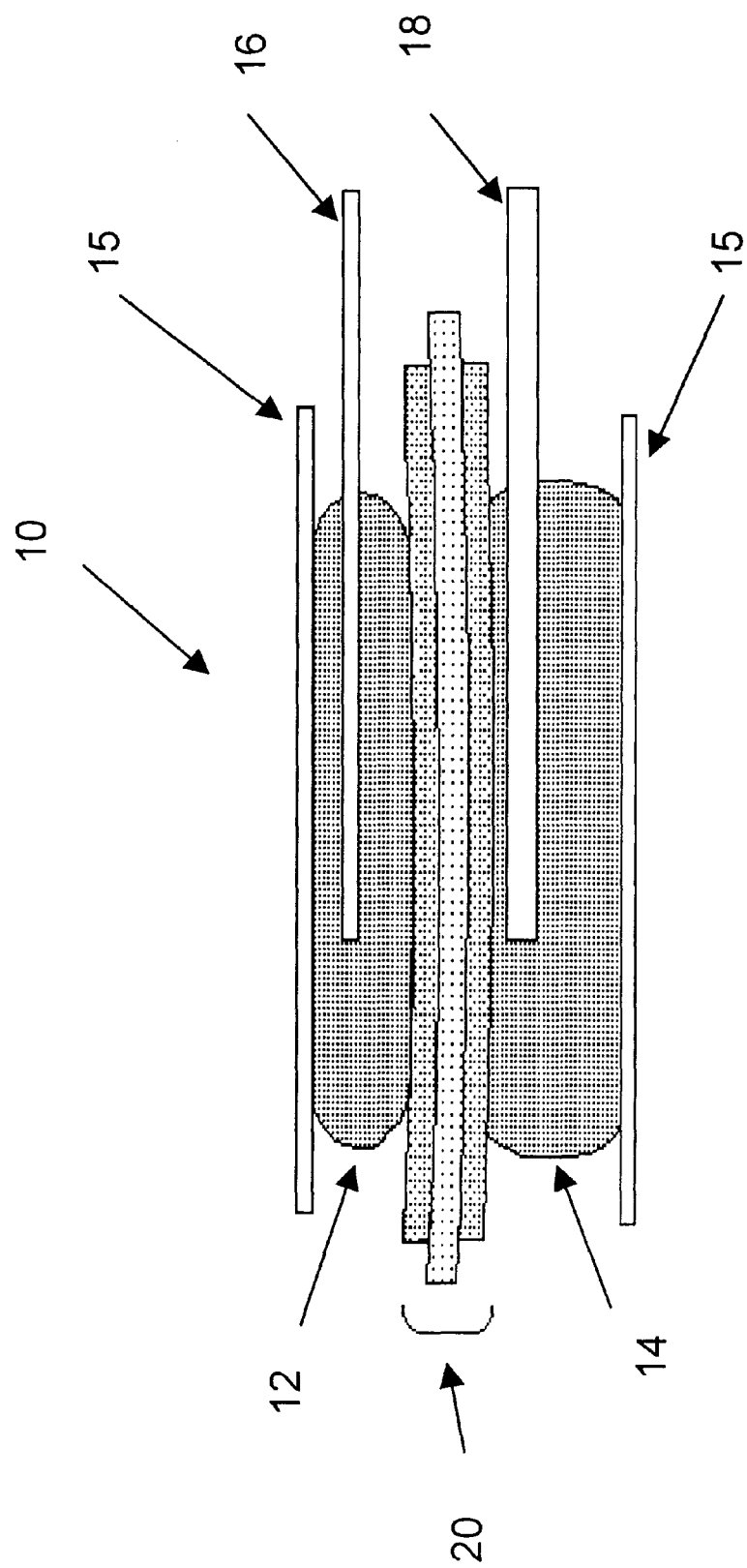
FIG. 1. is a side feed, radial flow fuel cell design.

The invention is an inorganic electrolyte fuel cell for electrical power, particularly powering automobiles, trucks, buses, locomotives, ships, etc. The fuel cell is a thermal shock and thermal cycling resistant inorganic electrolyte fuel cell that can be heated to operating temperature rapidly and survive many thousands of heating cycles. In addition, the inventive fuel cell can use liquid fuels such as diesel, gasoline, ethanol and methanol and the like. In another aspect, the invention relates to a fuel cell design, particularly a non-planar electrolyte design, for such a fuel cell. Advantages of such a fuel cell for transportation power include better fuel efficiency (better gas mileage), lower polluting emissions, lighter weight, no vibration, less friction and wear, less raw materials and due to the flexible ceramic foil design, ease of manufacturing.

The inventive fuel cell consists of manifold structures which are capable of reducing or limiting thermal stress on the cell components. The essential components of these structures are: 1) a flexible non-planar electrolyte sub-assembly; 2) fuel and oxidizer manifolding tubes, some of which may be porous and/or perforated; and 3) an optional electrically conductive current collector grid, mesh, felt or fiber mat composed of metal, cermet, metal coated ceramic or conducting ceramic.

A key aspect of the inventive fuel cell is that the cross-sections of the manifolding tubes are chosen so as to reduce the stress and limit the likelihood of crack initiation and propagation. The manifolding tubes may be cylindrical in nature, or of circular or elliptical cross-sections. Preferably, the manifolding tubes are circular and/or possess rounded features with no sharp edges. For example, the tubes may have square cross-sections but with rounded corners. Manifolding tubes with sharp corners are problematic because the sharp corners tend to act as stress concentrators during thermal cycling.

Another key aspect of the invention is the use of a non-planar, e.g., conical or smoothly curved, electrolyte sheet structure. The electrolyte sheet itself will have a non-planar shape that incorporates at least one stress relief region elevated above a sheet base plane. For the purpose of the present description we define the sheet base plane as a reference plane generally parallel with the sheet and containing the straight baseline spanning the largest linear dimension of the sheet. For adequate stress relief, the elevation of the sheet portion(s) above the sheet base plane should be such that the ratio of sheet elevation to largest sheet dimension is at least about 1:600, but no more than about 1:3. Preferably, this ratio will be no more than about 1:6. Flexible sub-assemblies consisting of intimately bonded anode/electrolyte/cathode sandwiches, such as described in U.S. Pat. No. 5,089,455 but with appropriately added curvature, are preferred. The sub-assemblies may also possess integral current collectors in the form of grids, or lines or porous conductive layers.

Preferably the electrolyte is chosen from ionic conductors such as yttria doped zirconia, calcia doped zirconia, rare earth oxides doped with aliovalent oxides such as: ceria doped with yttria and/or gadolinia and or ytterbia, and or erbia and other trivalent oxides, particularly other rare earths; trivalent rare earth oxides such as yttria, gadolinia, neodymia, ytterbia doped with aliovalent oxides such as magnesia, calcia, strontia and other +2 valence metal oxides and mixed rare earth gallates and aluminates such as lanthanum aluminate, and lanthanum gallate or neodynium aluminate and gallate doped with aliovalent oxides such as magnesia, calcia and other +2 valence metal oxides. The anode and cathode integral layers provide electrical contact, and three phase boundaries (gas/electrolyte/catalyst particle), on the surface of the electrolyte for the appropriate electrochemical reactions to occur.

In one particularly useful embodiment, a manifolded fuel cell with improved resistance to thermal or mechanical stress during operation is produced using circular flexible sub-assemblies. Unlike other manifold designs which tend to restrict the bending of the anode/electrolyte/cathode sub-assemblies, the present design allows the sub-assemblies to bend or flex to relieve stress. This is especially significant in the case of stress due to thermal gradients. Such stresses can be alleviated through buckling of the sub-assemblies. The buckling reduces the total stress in the sub-assembly, and therefore reduces the chance of breakage.

It is preferred that the manifolding tubes or, the tube in contact with the electrolyte, be of a material, which is closely matched in expansion to the electrolyte, and/or which is compliant due to the porous or perforated structure which the manifolding tubes possess. Corrugations of the electrolyte may also be made in the manifold or other tube contact areas for greater compliance. For zirconia-based electrolytes, such manifold materials may include, but are not restricted to, zirconia, zirconia-titania alloys, glass-ceramics in the alkali-rare earth-silicate family, glass-ceramics in the alkali-rare earth-silicate family, nickel and nickel-zirconia cermets, stainless steels (especially those in the ANSI 400 series), nickel alloys, and the like. If desired, one means of producing porosity in these materials is through partial sintering of powder compacts of these materials.

The means of collecting the current from the anode or cathode (the current collector) may be an integral part of the sub-assembly. The current collector may also employ a separate non-integral conductive wool, felt, or fibrous mat. If a relatively thick (>100 micron) current collector is employed, it should be of a compliant material so that the sub-assembly is able to bend to relieve stress.

The current collector should be chosen so that it is compatible with the oxidizing or reducing nature of the fuel cell environment. Current collector elements in contact with the cathode should include a conductor which is stable in an oxidizing environment. Examples of such conductors are noble metals, including silver, gold, platinum, palladium, as well as alloys and cermets of these. Other useful materials for the current collector include, oxidation resistant metals such as certain nickel alloys, conducting ceramics such as doped rare-earth oxides of chromium, manganese, cobalt, nickel, and the like, and doped zirconias, such as copper and titanium doped zirconium oxide.

Current collector elements in contact with fuel are chosen from conductors which are stable in reducing environments such as conducting metals including nickel, nickel cermets, such as nickel-zirconia cermets, ferrous alloys, chrome alloys, and the like, conducting ceramics such as doped rare-earth oxides of chromium, manganese, cobalt, nickel, and the like, as well as doped zirconias, such as copper and titanium doped zirconium oxide.

The manifold may be prepared so that adjacent sub-assemblies possess one of two possible relative orientations. In one of these the adjacent sub-assemblies are similarly oriented so that the anode of one sub-assembly is adjacent to the cathode of the next nearest sub-assembly (anode/electrolyte/cathode—anode/electrolyte/cathode). This first orientation can be referred to as a "A/E/C-A/E/C" repeating manifold in that the adjacent sub-assemblies repeat Anode/Electrolyte/Cathode in the same orientation. In this orientation adjacent cells can easily be connected electrically in series by connecting the cathode of one sub-assembly to the anode of the adjacent sub-assembly. Such an arrangement is similar to a battery in that the voltage across the total assembly is the sum of the voltages of all of the sub-assemblies. In the A/E/C-A/E/C repeating orientation, a non-porous metal or ceramic interconnect, or separator disk is required between each sub-assembly to separate the fuel which is in contact with the anodes from the oxidizer which is in contact with the cathode. The repeat unit of such a fuel cell generator can then be separator/current collector with manifolding tube section(s)/anode/electrolyte/cathode/current collector with manifolding tube section(s). This basic unit is repeated to form the manifold.

The current collector, if it consists of a wool or fibrous mat, may serve to allow the diffusion of the gases from the manifolding tube sections to each electrode. If the separator is electrically conducting then, when in operation, a complete circuit is made from the anode of one cell, through the electrolyte, the cathode, one current collector, the separator, and another current collector, to the anode of the adjacent cell. If the separator is not electrically conducting, then a separate means must be provided for completing the electrical circuit. If a separate means is provided for completing the circuit, then the assemblies may be connected either in series or in parallel.

In a second orientation, adjacent sub-assemblies are oriented in the opposite fashion so that the anode of one sub-assembly is adjacent to the anode of the next nearest sub-assembly, A/E/C-C/E/A (anode/electrolyte/cathode—cathode/electrolyte/anode). In the A/E/C-C/E/A manifold the separators are optional since this design does not require separation of the fuel and oxidizer between the adjacent sub-assemblies. The A/E/C-C/E/A design does require electrical isolation between the adjacent anodes or cathodes. This can be accomplished by a non-conducting separator or a non-conducting compliant porous layer, mat, or felt. In this manifold design a separate means of current transfer is needed. Electrical connection is made through some external means while connection is made via current collectors and conductive interconnects. The individual cells can be connected either in parallel or in series.

If the cells are connected in parallel then current-carrying busses can be provided to which all anodes or all of the cathodes are connected. If the cells are connected in series then interconnects must be provided between the anode of one cell and the cathode of another cell, usually the adjacent cell. By combining the methods of electrical interconnection described above it is possible to produce a wide variety of manifolded structures.

The invention is described below with particular reference to the drawings.

FIG. 1 is a schematic of a side feed fuel cell (10) design. The compliant current conductor or leads 12 and 14 positioned between cell interconnects 15 allow the thin electrode/electrolyte/electrode trilayer 20 to flex rather than break under mechanical and thermal loads. On the fuel side supplied by fuel tube 16 the current conductor 12 can be a nickel felt or thin metal foil bent into a helix. On the air side supplied by air tube 18 the conductor 14 can be an oxidation resistant metal or a conductive oxide in a variety of geometrical forms, felt or flexible thin helixes being two possibilities.

Figure 2:
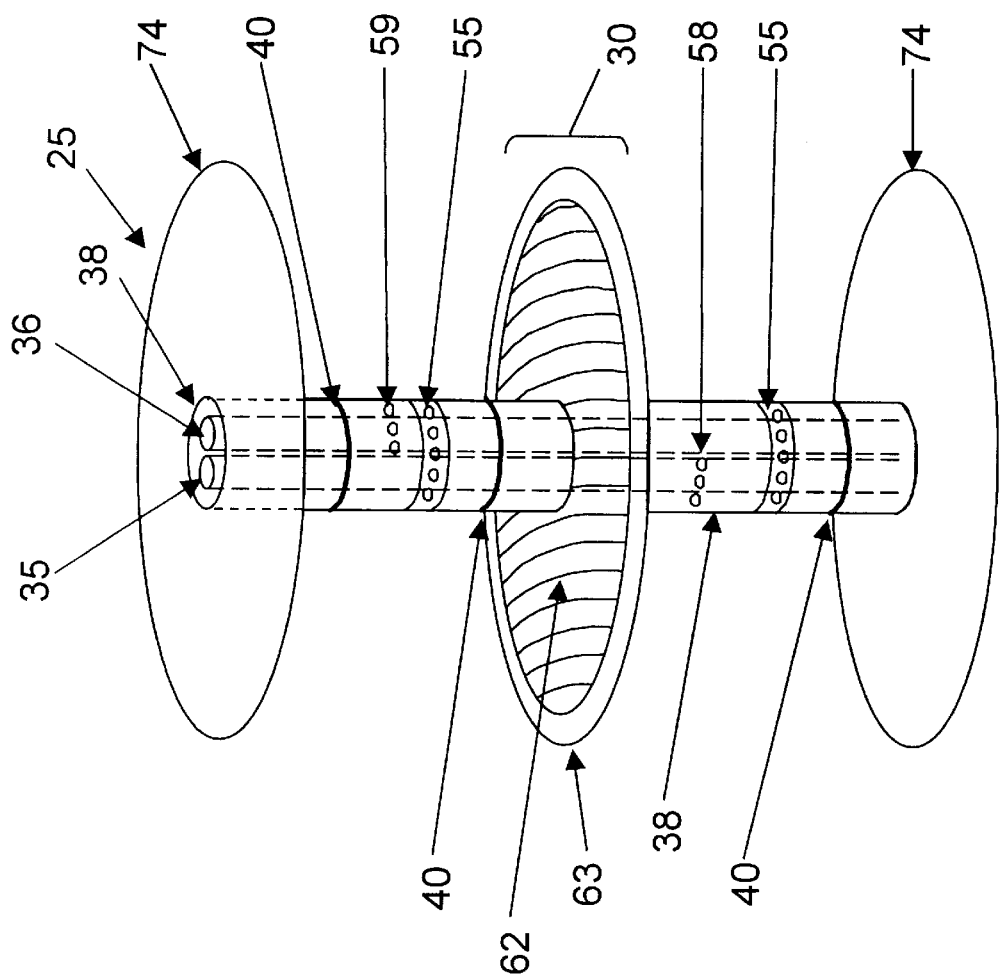
FIGS. 2 and 3 represent a center feed, radial flow fuel cell design showing a unit cell of a stack.
Figure 3:
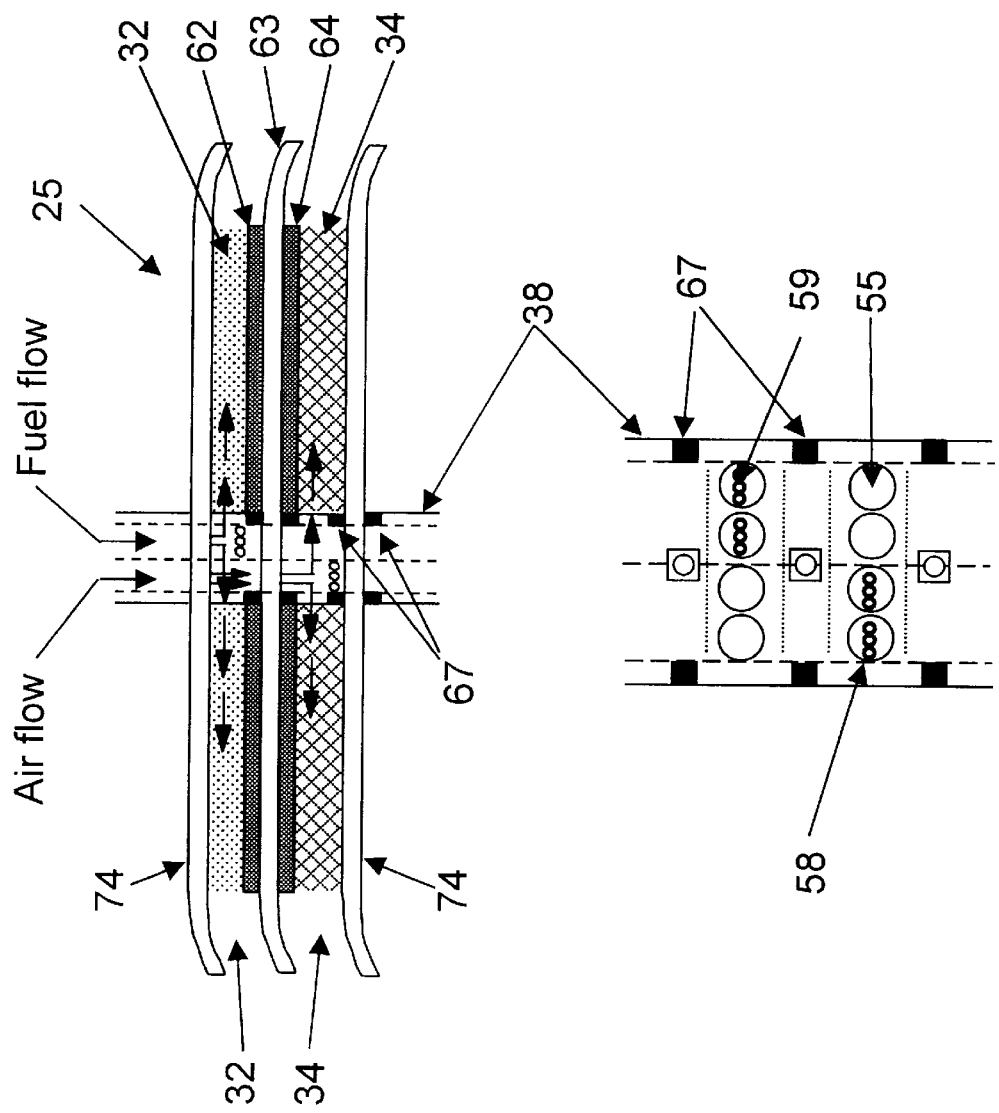

One preferred structure of the fuel cell is illustrated by FIGS. 2 (exploded view), and 3 (cross-section view), which show a unit cell of the stack. Both figures are schematic diagrams of a center feed fuel cell design (25) with a non-planar electrode/electrolyte/electrode foil (electrolyte sub-assembly) 30, as well as compliant/flexible current leads 32 and 34 shown in FIG. 3. FIG. 2 is a schematic exploded view of a centrally and/or internally manifolded solid oxide fuel cell (SOFC) stack "repeat unit" showing use of perforated metal manifold tubes 35 and 36 in a perforated ceramic tube 38 for gas delivery to the electrodes (anode 62 and cathode 64), with baffle rings 40 to prevent fuel/air mixing. FIG. 3 is a cross-sectional view of the repeat unit of FIG. 2 showing delivery of fuel and air, and use of fibrous mats 32 and 34 as current collectors. The fuel cell of this embodiment utilizes central manifolding tube sections through which the oxidizer and fuel respectively, pass, i.e., center feed, circular sub-assemblies with a central conduit. The electrolyte sub-assemblies 30 are stacked with manifolding tube sections. The outer-most ceramic tube section 38 has porous or perforated rings 55 which act as gas diffusers. Inside this ceramic tube are the two gas delivery manifolding tubes 35 and 36, one for the oxidizer (air) and one for fuel, which contain perforations 58 and 59 respectively, at the appropriate intervals.

The oxidizer and fuel exit the delivery manifold tubes, pass through the ceramic tube perforations 55, through the separator felt, wool, or fibrous mats 32 and 34 and come into contact with the anode 62 or cathode 64. Fuel and oxidizer are prevented from mixing within the annulus (between manifolding tubes and ceramic tubes) by metal or ceramic baffle disks 67 which are spaced at the same intervals as the electrolyte sub-assemblies and the metal interconnects 74. The gas delivery tubes 35 and 36, interior to the ceramic tube 38, are preferably made of an oxidation resistant metal such as those used for the separator disks. Finally, the thin and flexible electrolyte sub-assembly (30) consists of an anode/electrolyte/cathode sandwich, 62/63/64, preferably formed from sintered sheets of yttria partially stabilized or fully stabilized zirconia (TZP or YSZ), in which a central hole for gas passage is provided.

The thin sintered electrolyte layer can be formed as disclosed in U.S. Pat. No. 5,089,455. The electrodes may be slurry-coated or screen printed on both sides of the fully dense electrolyte disks. Both electrodes are then fired in air producing porous but adherent electronic conducting layers. The cathode can be a conducting perovskite ceramic such as lanthanum manganite, while the anode layer can be made from a mixture of yttria stabilized zirconia and nickelous oxide powders. The anode is reduced during operation in the fuel to a porous, conducting Ni-zirconia cermet.

The operation of the unit is done by providing fuel and air to the manifold, and the unit is brought to a sufficiently high temperature so that the electrolyte is conductive enough to sustain the reactions at the electrodes at rates required to draw the desired power. The current is drawn from the fuel cell by attaching leads to the first and last metal disks.

Figure 4:
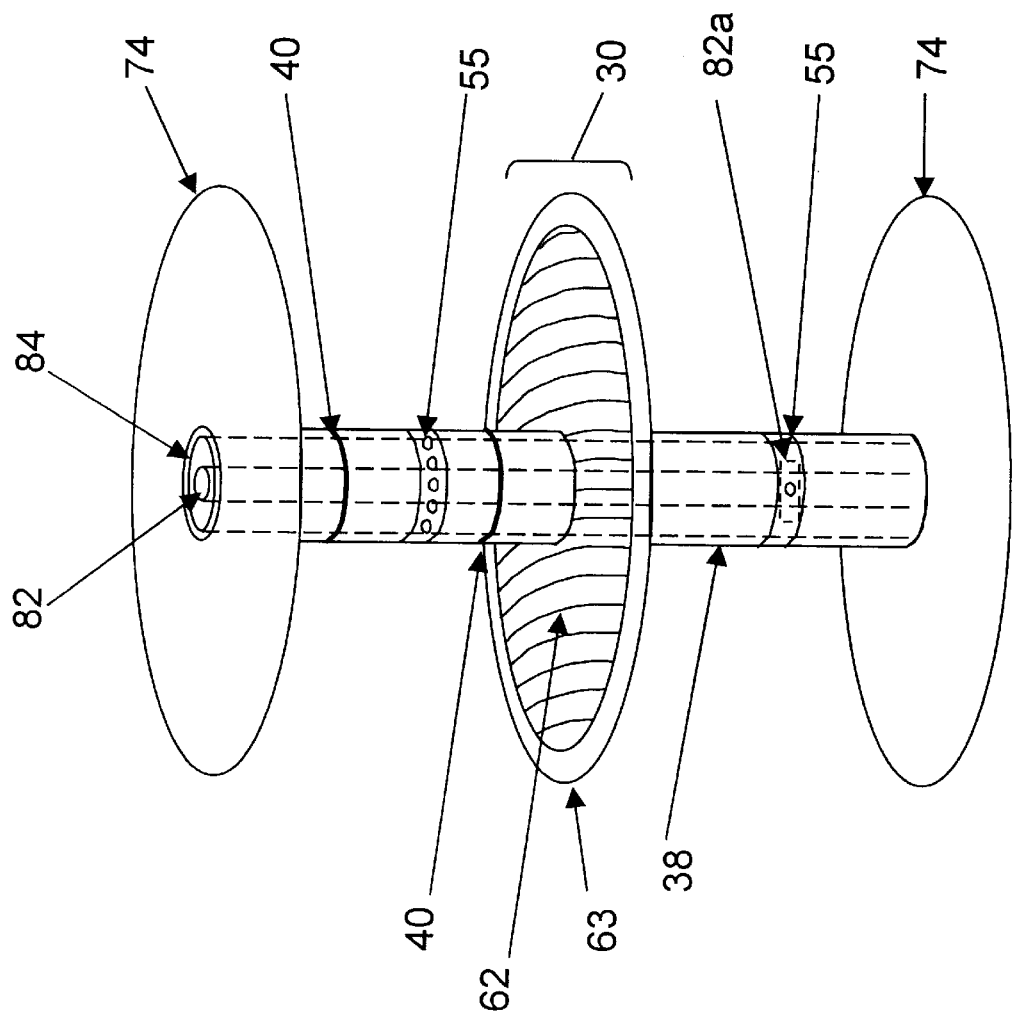
FIG. 4 is a schematic exploded view of a centrally internally manifolded solid oxide fuel cell (SOFC) stack "repeat unit" showing use of nested manifold tubes with perforated ceramic rings for gas delivery to electrodes, and baffles to prevent fuel/air mixing.
Figure 5:
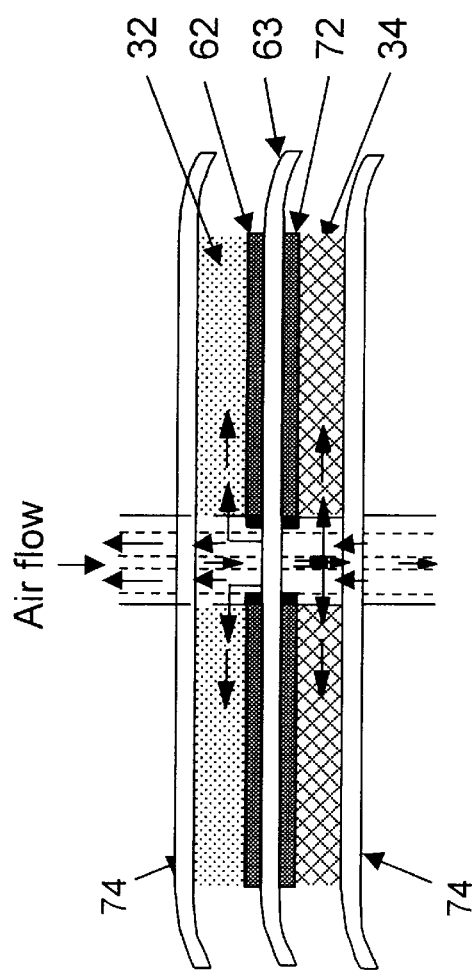
FIG. 5 is a cross-section view of the repeat unit of FIG. 4 showing delivery of fuel and air, and use of fibrous mats as current collectors
Figure 5:
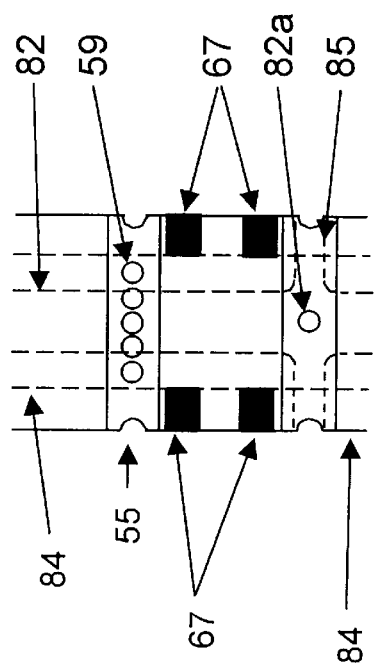

Another embodiment of the fuel cell uses concentric air and fuel manifold tubes 82 and 84 respectively within the ceramic tube 38. It is shown in FIGS. 4 (exploded view), and 5 (cross section). As the figures show, the porous or perforated ceramic rings 55 and the gas seal baffles 67 in the annular space are similar to those shown in FIGS. 2 and 3. However, in the concentric design, between the cathode 72 and adjacent metal interconnect 74 the inner-most air tube 82 must feed through the fuel tube 84 via air side tubes 82a. Therefore, gas tight weld seals 85 are needed at this intersection to prevent mixing of air and fuel in the fuel manifold tube.

Figure 6:
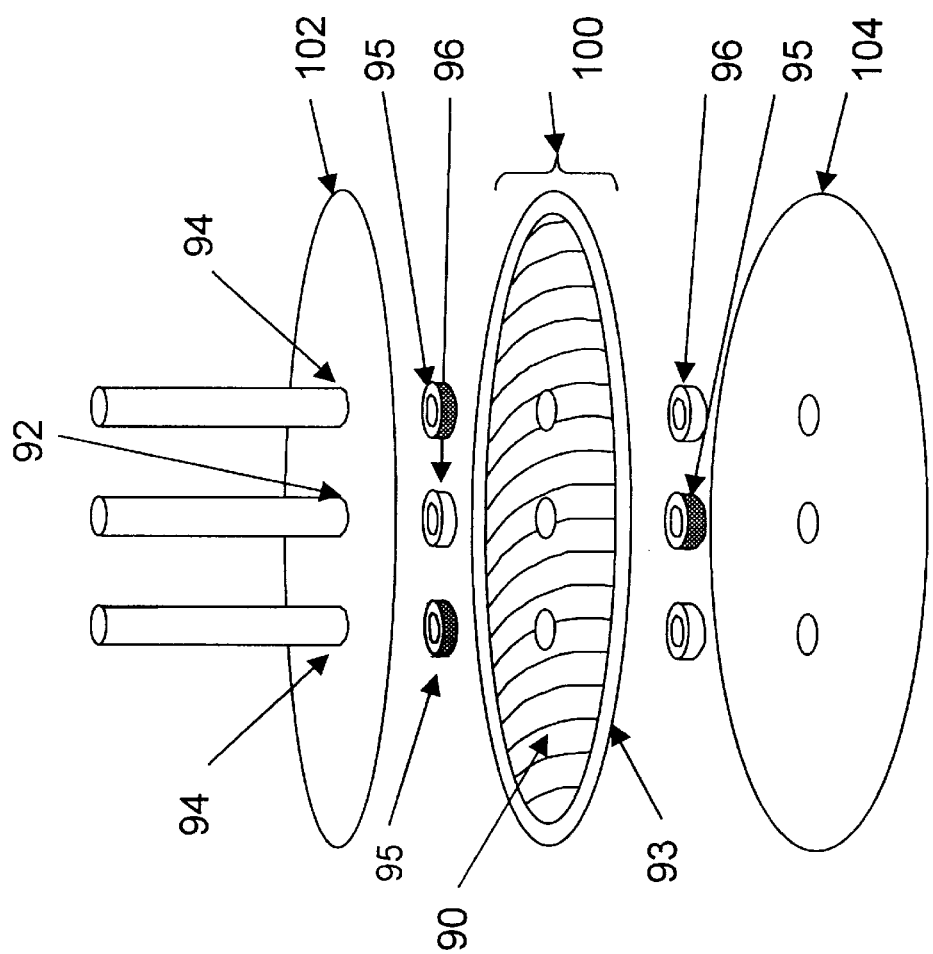
FIG. 6 is an exploded view of a repeat unit showing use of porous and non-porous spacers to separate layers and deliver fuel and air.
Figure 7:
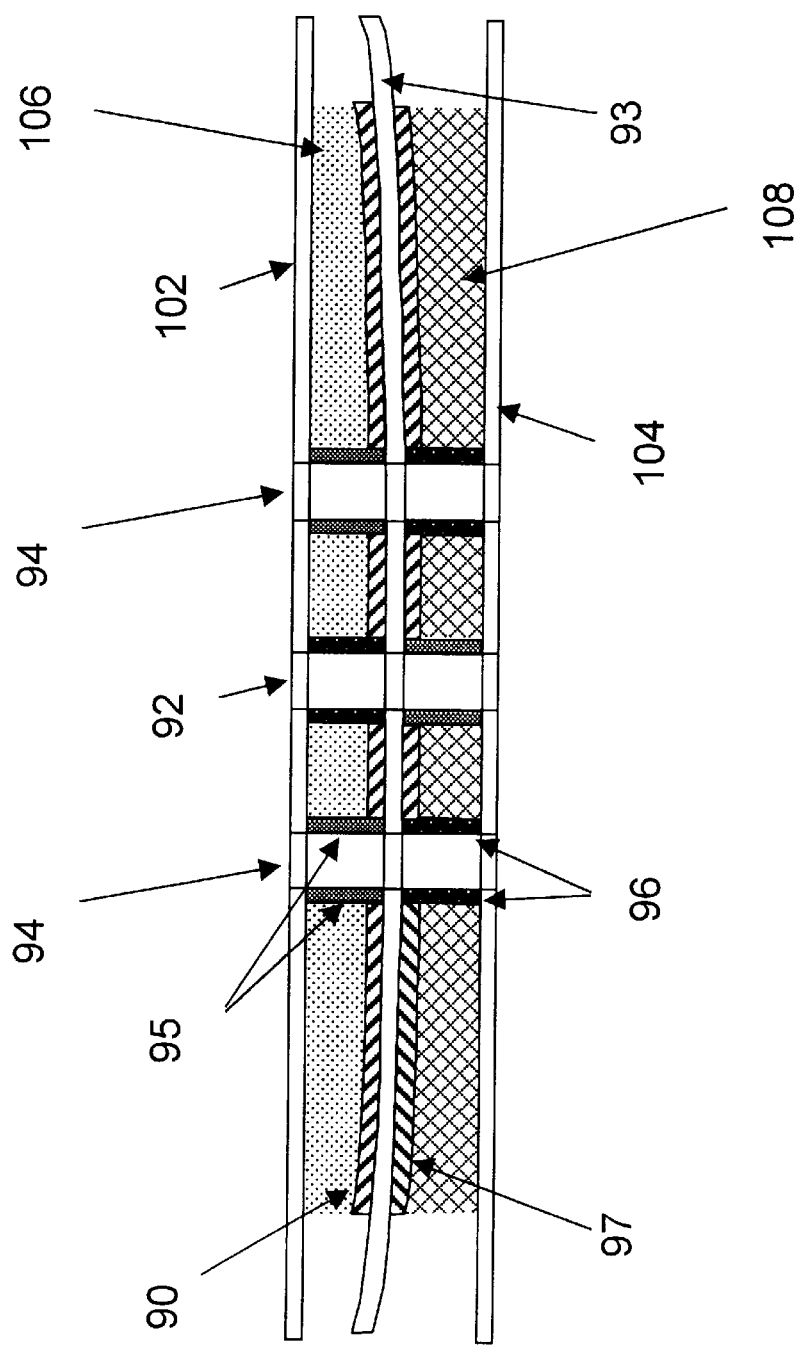
FIG. 7 is a cross-sectional view of the repeat unit of FIG. 6 showing use of porous and non-porous spacers to separate layers and deliver fuel and air, and use of fibrous mats as current collectors.

In yet another embodiment of the invention the central manifolding tube is replaced by two or more manifolding tubes. This example is shown in the schematic diagrams of FIGS. 6 (exploded view), and 7 (cross section). As shown in the drawings, porous and non-porous spacers 95 and 96 respectively, are attached to the sub-assembly, and connected to the metal interconnect disks 102 and 104 from both the anode (90) and cathode (97) sides of electrolyte 93. Porous spacers 95 are used in the central air passage 92 on the cathode sides of each sub-assembly, while the fuel passages 94 have non-porous spacers 96 so that only air can diffuse along this level. On the anode side of the sub-assembly the fuel passages have porous spacers, while the air passage has a non-porous spacer. The separation distance between the electrolyte sub-assembly 100 and metal interconnect disks 102 and 104 respectively is determined by the spacer height. The cross-sectional view of FIG. 7 shows the basic repeat unit of a fuel cell generator (metal disk/spacers/sub-assembly/spacers), which is then repeated to form the manifolds. Each metal disk/sub-assembly/metal disk makes up a manifold layer.

Each embodiment described above may have other configurations. For instance, the sub-assemblies may be ordered so that the anodes of the adjacent sub-assemblies face each other. Again the current is collected using a porous current collector, but in this configuration additional bus-bars are provided.

A conductive wool or felt between the sub-assembly and each metal interconnect disk allows a low stress way of separating the sub-assembly and metal disk layers. At the same time the felts permit the diffusion of the gases to each electrode, while also electrically connecting them to the metal disks for current collection or electrical connection of sub-assembly cells. The anode felt 106 could be made of Ni, while the cathode side felt 108 could be an Ag-Pt coated fibrous mat.

In a comparative example, we prepared a finite element thermo-stress model of a 30 micron thick planar, flat plate electrolyte membrane measuring 3 inches in diameter with a ½ inch diameter center hole, with an outer edge at 800° C., and inner edge at 25° C. (10 micron thick air electrode, 10 micron thick electrolyte, 10 micron thick fuel electrode) with the elastic modulus of room temperature dense zirconia $-3$ mole % yttria (200 GPa) and the thermal expansion coefficient of dense zirconia ($110 \times 10-7/°$ C. from 25–1000° C.). We imposed a steady state thermal gradient of 800° C. from the edge to the center of a 3 inch (7.62 cm) diameter disk with a 0.5 inch (1.27 cm) hole in the center to mimic both the temperature gradient and stresses that could occur during rapid heating (start-up) of a center feed fuel cell design such as shown in FIG. 2. We found that the stresses in this model were perfectly symmetric and no bending occurred. Without bending this thermal gradient will produce stresses of over 240 Kpsi (1.65 GPa) at the inner surface of the half inch hole in this model. This stress will shatter almost all ceramic materials and this type of stress precludes the use of a flat ceramic electrolyte that can not bend in rapid heating situations. This stress is indicative of what a thick plate solid oxide fuel cell will experience.

To illustrate the advantages of the present fuel cell design, in another example, we prepared a finite element thermo-stress model of the same thirty micron thick membrane non-planar structure (a very shallow cone shape) with a cone height of 0.1 inch (0.254 cm), 30 microns thick, 3 inches in diameter with a ½ inch diameter center hole, outer edge at 800° C., inner edge at 25° C. We found the maximum stresses were a factor of 40 lower than observed in the planar model, i.e. less than 6 Kpsi (41 MPa). Most ceramic electrolyte materials can withstand such a stress. This stress model illustrates the marked reduction in stress which can be achieved by using thin, flexible electrolytes.

Table I lists the maximum stresses present as a function of cone height. With a cone height of 0.5 inches (1.27 cm) the maximum tensile stresses drop below 1,000 psi (6.89 MPa). It is possible to make such cone shaped electrode/electrolyte/electrode trilayers either by sintering into a cone shape or by plastic deformation at high temperature.

TABLE I

| Cone height Inches (cm) | Maximum stress Kpsi (MPa) | Minimum stress Kpsi (MPa) |
| --- | --- | --- |
| 0.0 {flat} | 247 (1,700) | −81.3 (−558) |
| 0.001 (0.0025) | 353 (2,432) | −81.4 (−561) |
| 0.005 (0.0127) | 125 (861) | −86.1 (−593) |
| 0.01 (0.0254) | 61.9 (426) | −50.7 (−349) |
| 0.05 (0.127) | 11.3 (78) | −11.9 (−82) |
| 0.1 (0.254) | 5.5 (38) | −6.1 (−42) |
| 0.5 (1.27) | 0.98 (6.8) | −1.2 (−8.3) |

Table II lists the maximum stresses in a finite element model of a corrugated disk 8 inches (20.32 cm) in diameter with a 0.2 inch (0.508 cm) diameter hole in the center with an 800° C. to 25° C. steady state temperature gradient imposed from edge to center. Again the disk was thirty microns thick with the elastic modulus of dense zirconia −3 mole % yttria at room temperature. The corrugation height is 0.1 inch (2.54 mm) or 0.2 inch (0.508 cm) and the corrugations were concentric around the center hole and evenly spaced from the center to the edge.

TABLE II

| | Maximum stresses in Kpsi (MPa) | |
| --- | --- | --- |
| Number of | Corrugation Height | |
| corrugations | 0.2 inch (0.508 cm) | 0.1 inch (0.254 cm) |
| 3 | 2.755 (18.98) | — |
| 5 | 2.002 (13.79) | — |
| 7 | 1.756 (12.10) | — |
| 9 | 1.840 (12.68) | 4.208 (29.00) |
| 11 | 2.219 (15.29) | 3.445 (23.74) |
| 13 | — | 3.413 (23.52) |
| 15 | 2.350 (16.19) | 3.201 (22.06) |
| 17 | — | 3.311 (22.81) |

These finite element models prove that a thin flexible non-planar electrolyte that is free to bend and flex through compliant current connections can have extremely low stresses under thermal shock conditions and will survive rapid heating that fuel cell designs with thick flat plate electrolytes cannot.

EXAMPLES

The round disks referred to in the following examples, the electrolyte and particularly the electrolyte/electrode foils, are not flat in that the disk in all the examples had bumps or waves of greater than 200 microns in height, i.e., more than a 600:1 diameter to height ratio.

1) The edge of an approximately fifteen micron thick disk of zirconia −3 mole % yttria was put into the flame of a propane gas torch. The edge of the sample heated to over 1000° C., probably more than 1400° C., in less than about three seconds. The sample did not break or crack. This was repeated more than fifteen times. This simple experiment proves that a thin ceramic electrolyte with enough strength can be very thermal shock resistant if allowed to flex. Over a hundred samples of thickness ranging from about 5 microns to about 35 microns of zirconia −3 mole % yttria, zirconia −4 mole % yttria and zirconia −3 mole % yttria +20 wt. % alumina have survived similar treatment.

2) The edge of an approximately fifteen micron thick disk of zirconia −3 mole % yttria with porous platinum electrodes approximately ten microns thick on both sides was put into a propane torch as in example one. This fuel cell electrode/ electrolyte/electrode tri layer did not break or crack even after over twenty of these extreme thermal cycles. This proves a fuel cell trilayer can be extremely thermal shock resistant if the trilayer is allowed to elastically bend and deform.

3) A round disk of zirconia −3 mole % yttria disk about 13–15 microns thick and 1 and 9/16 inch diameter was placed on an electrical heater and cycled from approximately 150–200° C. to about 700° C. over 4,000 times. For this experiment, we used as the heater, a metal honeycomb electrically heated catalyst (EHC, from Corning) having a serpentine electrical path. It took about 1 minute to heat up, held at about 700° C. for one minute and then cooled over two minutes for a total cycle time of about 4 minutes. The sample did not fracture or crack. Optical microscopy showed no sign of water vapor/stress degradation.

4) A rectangular piece of zirconia −3 mole % yttria about 30 microns thick, 7/16 inch long by 3/8 of an inch wide was mirror polished to a 0.3 micron diamond paste finish. This sample underwent the same thermal cycle as Example 3 but only for slightly more than 3,700 cycles in ambient humidity for late November in Corning N.Y. This sample was examined by optical microscopy, including a Nomarsky interference microscope (Nikon Microphot-FX), and examined for surface roughness. No surface roughness was found, indicating that there is no water vapor corrosion in these materials under these conditions.

5) Five strips of aluminum foil about 3 mm wide, about 25 microns thick, were wound into a helical shape about 3 to 4 mm in diameter and about 3 cm long. The helix was stretched so that a gap of 0.5 to 1 mm was present between the adjacent turns on the metal coil. These five helixes were bonded between two 3 cm×3 cm zirconia membranes about 25 microns thick. Both sheets could be flexed and the helixes would bend slightly also. Room temperature flexing showed that this electrolyte foil could be bent to more than several millimeters out of shape with no fracture even with the aluminum foil helixes attached.

6) Three strips of Kanthal A-1 (available from Kanthal AB, Hallstahammar, Sweden) heat resistant alloy about 2 mm wide and 50 microns thick were wound into a helical shape about 3–4 mm in diameter and about 3 cm long. The helix was stretched so that a gap of 0.5 to 1 mm was present between adjacent turns on the coil. The three coils were bonded between two 3 cm by 3 cm zirconia membranes about 25 microns thick with double stick tape. The two zirconia foils could be flexed and the Kanthal metal coils would flex also. The sample was not thermally tested. However, room temperature flexing showed that the electrolyte foil could be bent to more than several millimeters out of shape without fracture even with the Kanthal foil helixes attached.

7) In this example, the electrolyte and electrode combination formed a slight dome shape with the height of the dome about 3 mm high on each electrolyte/electrode combination sheet. (La,Sr)MnO3 electrodes were tape cast on one side each of two zirconia −3 mole % yttria electrolyte foils, about 25 microns thick and in an octagon shape about 7 cm from flat octagon side to flat octagon side. Seven Kanthal A-1 helixes were made as above. The helixes were dipped into (La,Sr)MnO3 slip and placed between the two coated electrolytes. A small weight was placed on the top of the electrolyte/electrode combination and the structure was fired at 1200° C. in air for two hours. The electrode structure after firing was porous, less than 25 microns thick and electrically conductive. The thermal expansion match was not perfect as the edges of the electrolyte/electrode foil curled slightly. The current connection coil structure did bond to the electrode layer. This two layer fuel cell structure flexed slightly without bond failure. The structure was electrically conductive from one octagon electrode layer to the second octagon electrode layer. The structure was thermal cycled from about 250° C. to about 700° C. more than 700 times with a three minute heating and a three minute forced air (fan) cooling cycle (for a total cycle time of 6 minutes). The electrolyte/electrode foil showed no damage. However, some of the sintered bonds between the current lead coils and the foil did break. After 1,400 thermal cycles the majority of the helixes bonds had broken but the electrode/electrolyte foils showed no damage. Post-test examination showed that very little of the (LaSr)MnO3 slip remained on the top surface of the helixes while the bottom of the coils had too much material and was thick, but bonded. The material flowed when the coils were placed on the octagons.

The above examples show that if flexible current connections are accomplished, thin flexible electrode/electrolyte bi- and tri-layers can survive extreme thermal shock conditions. Such thermal shock conditions are expected when solid oxide fuel cells are used for electrical power in automobiles.

While the invention has been described above with respect to specific examples, these examples are not intended to be limiting as it will be clear to persons skilled in the art that numerous modifications and variations may be introduced without deviating from the scope and spirit of the invention.

What is claimed is:

1. A solid electrolyte fuel cell having an oxidant reservoir, a fuel reservoir, and an electrolyte structure interposed between the oxidant and fuel reservoir, the electrolyte structure including a flexible anode/electrolyte/cathode sub-assembly wherein the electrolyte structure is a non-planar structure of a thin, flexible, pre-sintered, polycrystalline ceramic sheet that includes at least one elevated stress relief section having a sheet elevation above the sheet base plane such that the ratio of the sheet elevation to the largest sheet dimension is in the range of about 1:600 to 1:3 and the sheet is capable of withstanding up to 4,000 heating cycles of from room temperature to operating temperatures of up to 1000° C., said cycle being in range one minute to one hour;

the fuel cell further comprising at least one fuel manifolding tube, and at least one oxidizer manifolding tube, said manifolding tubes being composed of materials selected from the group consisting of zirconia, zirconia-titania alloys, glass-ceramics having alkali-rare earth-silicate, nickel and nickel-zirconia cermets, stainless steel materials, and nickel alloys, wherein said electrolyte sub-assembly and the manifolding tubes are closely matched in thermal expansion.

2. A solid electrolyte fuel cell according to claim 1 wherein the non-planar structure has a shape selected from the group consisting of a cone, a section of a sphere, and an elliptical cross-sectional dome, and a ratio of sheet elevation to largest sheet dimension in the range of 1:6 to 1:600.

3. A solid electrolyte fuel cell according to claim 1 wherein the non-planar structure has a sheet boundary shape selected from the group consisting of circular, oval, elliptical, pentagonal, hexagonal, heptagonal, and octagonal, and a ratio of sheet elevation to largest sheet dimension in the range of 1:6 to 1:600.

4. A solid electrolyte fuel cell according to claim 1 wherein the non-planar structure has a smoothly curved, domed shape.

5. The solid electrolyte fuel cell according to claim 1 wherein the electrolyte is characterized by a central feed design.

6. The thermal shock resistant fuel cell according to claim 1, wherein said solid electrolyte comprises flexible or compliant current collectors.

* * * * *